United States Patent
Elbaum

[11] 3,719,952
[45] March 6, 1973

[54] FLUERIC READOUT SYSTEM

[75] Inventor: Saul Elbaum, Silver Spring, Md.

[73] Assignee: The United States of America as represented by the Secretary of the Army

[22] Filed: March 4, 1971

[21] Appl. No.: 121,082

[52] U.S. Cl. ................. 346/75, 137/81.5, 235/200, 346/140
[51] Int. Cl. ..................... G01d 5/42, G01d 15/16
[58] Field of Search ............ 346/75, 140; 235/200 PF, 201 PF; 137/81.5

[56] References Cited

UNITED STATES PATENTS

| | | |
|---|---|---|
| 3,541,959 | 11/1970 | Taffel ........................... 137/81.5 X |
| 3,152,858 | 10/1964 | Wadey ............................... 346/75 |
| 3,190,554 | 6/1965 | Gehring et al. ..................... 235/201 |
| 3,267,481 | 8/1966 | Bauer et al. ..................... 346/75 X |
| 3,373,438 | 3/1968 | Hochberg ........................... 346/75 |
| 3,570,275 | 3/1971 | Weber et al. ..................... 346/75 X |

Primary Examiner—Joseph W. Hartary
Attorney—Edward J. Kelly, Harry M. Saragovitz, Herbert Berl and Saul Elbaum

[57] ABSTRACT

A flueric readout system is disclosed in which a visual permanent record, as a function of time, is obtained of the output of a fluid amplifier without the use of moving parts or electromechanical transducers. A supply of marking medium capable of imparting impressions upon a recording surface is combined with a fluid amplifier of the proportional or digital type such that the flow of fluid in at least one output channel of the fluid amplifier causes the flow of the marking medium onto the recording surface. The recording surface is typically in the form of a paper chart recorder which travels at a predetermined rate. In one embodiment the flow of marking medium is accomplished by extending a passage from a supply of marking medium into at least one output channel of the amplifier at such an angle that the marking medium is drawn into the output channel and deposited on the moving recorder. In a second embodiment, the marking medium is supplied directly to the power nozzle of a secondary fluid amplifier and the action of the primary fluid amplifier causes the marking medium in the secondary fluid amplifier to switch from one or the other of two output channels. One of the output channels extends onto the recorder while the other output channel returns unused marking medium to its reservoir. In a third embodiment, both output channels of the secondary amplifier direct the marking medium onto the recorder so as to obtain simultaneous comparison of both channels.

7 Claims, 4 Drawing Figures

INVENTOR,
SAUL ELBAUM

FLUERIC READOUT SYSTEM

RIGHTS OF THE GOVERNMENT

The invention described herein may be manufactured, used, and licensed by or for the United States Government for governmental purposes without the payment to me of any royalty thereon.

BACKGROUND OF THE INVENTION

This invention relates to flueric readout systems, and more particularly to a flueric system for providing a visual permanent record, as a function of time, of the output of any fluid amplifier without the use of moving parts or transducers.

With the invention of the fluid amplifier there arose a simultaneous need for monitoring and recording the outputs of fluid devices. Since fluid amplifiers generally operate by the interaction of impinging jets of air which are not normally visible to the eye, the approach of monitoring such devices has generally been to provide transducer systems in which the pressure associated with airflow causes some mechanical and/or electrical response. One common mechanical transducer system consists of a float which is positioned by the action of opposing fluid output channels. In a similar system, a pointer is associated with the mechanical motion of a piston and a scaler, located adjacent to the pointer, provides the desired visual quantitative indication. Such a system is disclosed in the patent to Lazar issued Apr. 7, 1970, U.S. Pat. No. 3,504,689. In an alternate system, the action of opposing fluid output channels causes a bellows to expand, the bellows being provided with a pointer and a scale as in the previously mentioned system. Both these systems suffer from the obvious disadvantage that inefficient mechanical motion is required to achieve a visual output reading. A more sophisticated fluid amplifier readout system is based upon the use of an electromechanical transducer, such as a piezoelectric crystal, to convert fluid energy to electrical energy. Here again there is the need for an energy conversion process in order to obtain a visual indication of the action of a fluid amplifier.

It is, therefore, a primary object of this invention to provide a visual permanent output of the action of a fluid amplifier without the use of moving parts or electromechanical transducers.

Another object of this invention is provide a visual permanent record, as a function of time, of both the duration and magnitude of a fluid signal without the use of moving parts or transducers.

Yet another object of this invention is to provide a flueric readout system which is itself comprised of fluid medium and is thereby inherently compatible with the fluid system being monitored.

These and other objects, aspects, uses and advantages of the invention will clearly appear from the following description and from the accompanying drawings.

SUMMARY OF THE INVENTION

Briefly, in accordance with this invention, a supply of marking medium, capable of imparting impressions upon a suitable recording surface, is combined with at least one output channel of a primary fluid amplifier such that the flow of fluid in that channel causes the marking medium to be deposited upon the recording surface. A visual permanent record, as a function of time, is obtained by causing the recording surface to traverse beneath the flow of the marking medium at a predetermined rate. In one embodiment, a passage is provided between at least one output channel of the primary fluid amplifier and the supply of marking medium such that the flow of fluid in the output channel draws the marking medium along into the output channel and subsequently deposits the marking medium onto the recording surface. The amount and duration of marking medium which is deposited on the recording surface is directly proportional to the magnitude and duration of the fluid flow in the output channel being monitored. Of course, two or more output channels of a single or of a plurality of fluid amplifiers may be monitored simultaneously. In a second embodiment, the means for causing the flow of marking medium is a secondary amplifier whose power nozzle is supplied with marking medium fluid. One output channel of the secondary amplifier is directed to the recording surface and the second output channel returns unused marking medium to a reservoir. The arrangement is such that in the absence of a control signal from the primary fluid amplifier, the marking medium is automatically returned to the reservoir, whereas the application of a control signal from the primary fluid amplifier causes the fluid marking medium to be deposited upon the recording surface in an amount and duration proportional to the control signal. In a third embodiment, the secondary fluid amplifier is capable of simultaneously monitoring both outputs of the primary fluid amplifier. An output signal from either channel of the primary fluid amplifier causes an appropriate response in one or both channels of the secondary fluid amplifier. Both output channels of the secondary fluid amplifier are applied to the same recording surface for simultaneous comparison.

DESCRIPTION OF THE PREFERRED EMBODIMENTS

Figure 1:
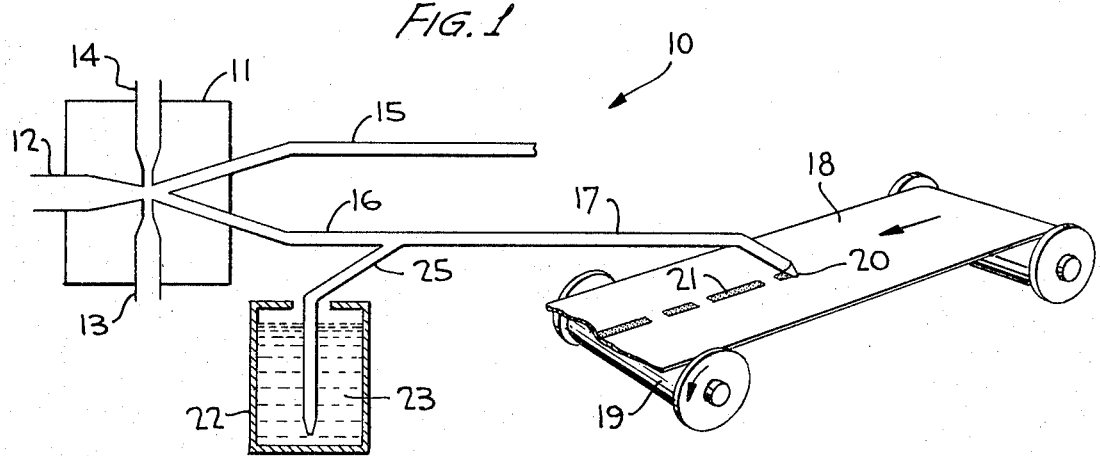
FIG. 1 illustrates an embodiment of the invention in which fluid marking medium is drawn into at least one output channel of a fluid amplifier.

Referring now to FIG. 1, numeral 10 indicates generally one embodiment in accordance with the present invention. Fluid amplifier 11 having a power nozzle 12, controls channels 13 and 14 and output channels 15 and 16 is being monitored at its output by flueric readout system 10. Output channel 16 has an extended portion 17 which transmits fluid marking medium 23 from a reservoir 22 onto a suitable recording surface 18. The marking medium 23 is drawn into the extended portion 17 of output channel 16 by means of fluid passage 25 which extends into the marking medium. Passage 25 is connected to output channel 16 at such an angle that the flow of fluid through output channel 16 and its extension 17 creates a greatly reduced wake pressure which is sufficiently below ambient or surrounding pressure. Since ambient pressure is maintained in reservoir 22, the pressure downstream of channel 25 is sufficently less than ambient pressure so as to cause the fluid marking medium 23 to be drawn into the stream flowing through output channel 16. The volume of fluid marking medium 23 which is drawn into channel 17 by this entrainment action is proportional to the rate of fluid flow within channels 16 and 17. Thus, when fluid amplifier 11 is operating so as to direct all the fluid out through channel 15, no fluid marking medium is drawn into channel 17.

After passage through outlet channel 17, the fluid marking medium is deposited upon recording surface 18 by means of a small opening 20 so as to produce a well defined series of marks 21. The recording surface 18 is moved along in the direction of the arrow as shown by means of a suitable rolling mechanism 19 at a predetermined rate in a manner well known in the art. Any appropriate rolling mechanism may be employed.

The fluid amplifier 11 can be either of the proportional or digital type. Where fluid amplifier is of the digital type, the output markings 21 will be in the nature of the series of long and short dashes or lines such as shown in FIG. 1, the duration of each of these lines being proportional to the duration of fluid flow in output channel 16. On the other hand, if fluid amplifier 11 is of the proportional type the output markings 21 will vary not only in length but also in width as well as density of marking medium on the paper. This is illustrated in FIG. 2 and is a result of the fact that the amount of marking medium drawn into channel 17 is directly proportional to the rating of fluid flow in channels 16 and 17.

Figure 2:
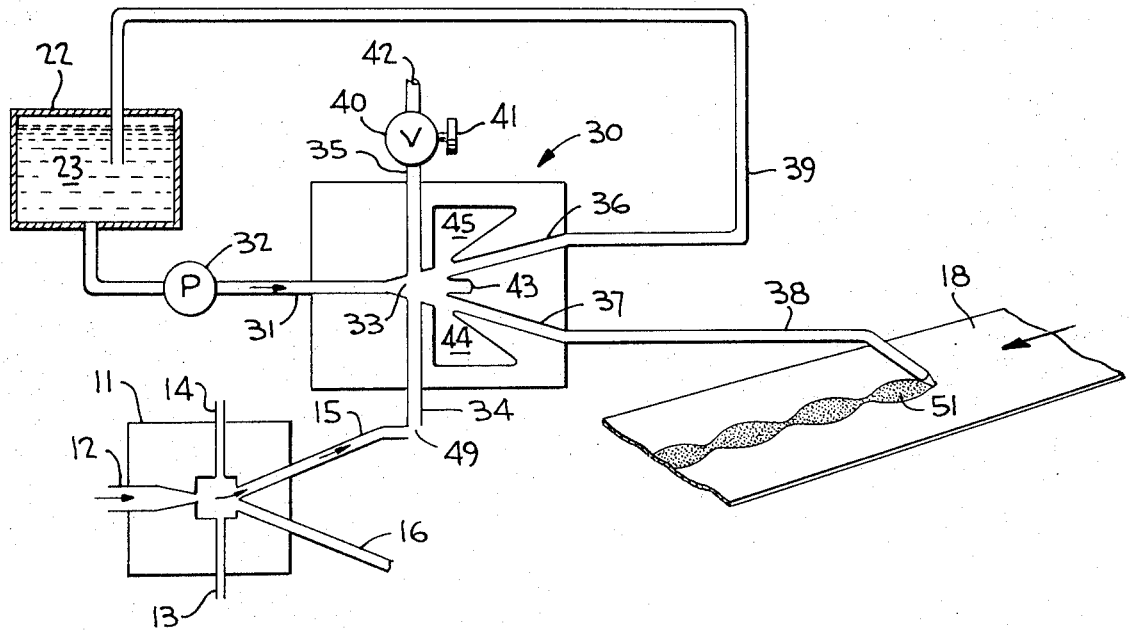
FIG. 2 illustrates an embodiment of the invention in which fluid marking medium is supplied to the power nozzle of a secondary fluid amplifier which is controlled by the output of the primary fluid amplifier being monitored.

The embodiment of FIG. 2 illustrates an arrangement in which the fluid marking medium 23 constitutes the power fluid for a secondary fluid amplifier. The fluid marking medium 23, maintained within reservoir 22, is supplied to secondary amplifier 30 by means of supply channel 31 and pump 32. The marking medium enters interaction chamber 33 at which point it divides between output channels 36 and 37. Output channel 37 leads into extended channel 38 which in turn deposits marking medium upon recording surface 18. Output channel 36 feeds into channel 39 for returning a portion of marking medium 23 to its reservoir 22. Additionally, fluid amplifier 30 is provided with control channel 35 which further includes a valve 40 operated by a suitable knob 41 for selecting the amount of ambient pressure which is permitted to enter control channel 35 by way of opening 42. At the opposing end of interaction chamber 33 is a control channel 34 next two which is located the output channel 15 of fluid amplifier 11.

In operation, valve 40 is partially closed so that in the absence of a signal in output channel 15 of fluid amplifier 11 an uneven pressure distribution exists across interaction chamber 33. The result is that the fluid marking medium in amplifier 30 is directed to output channel 36 are returns to reservoir 22. When a control signal is applied to control channel 14 of fluid amplifier 11 so as to direct power fluid 12 into output channel 15, the flow of fluid past the opening 49 of control channel 34 causes blockage of the control channel 34. This, in turn, causes additional entrainment of ambient air through opening 42 of control channel 35 so as to switch a portion of the fluid in amplifier 30 towards output channel 37. That portion of the fluid is then deposited onto recording surface 18. The provisions of cavities 43, 44, and 45 aid significantly in diverting the liquid marking medium 23, which is the operating fluid for amplifier 30, by means of air controls at control channels 34 and 35. The reasons for the use of these cavities are more fully set forth in a patent to Binder issued June 25, 1968, U.S. Pat. No. 3,389,894. Since secondary amplifier 30 is of the proportional type, it will respond proportionally at its output channel 38 to a change in fluid amplifier 11. On the other hand, if fluid amplifier 11 is of the digital type, fluid amplifier 30 will follow accordingly, that is, no marking medium output will be available when no signal is applied to output channel 15 of fluid amplifier 11. The pattern 51 on recording surface 18 illustrates a typical pattern which may be obtained where the flueric readout system is monitoring a proportional fluid amplifier. By employing a densitometer reading at the center of pattern 51, one may obtain a density reading which is proportional to the magnitude of the signal in output channel 37 of fluid amplifier 30, the latter being proportional to the magnitude of the signal in output channel 15 of amplifier 11.

Figure 3:
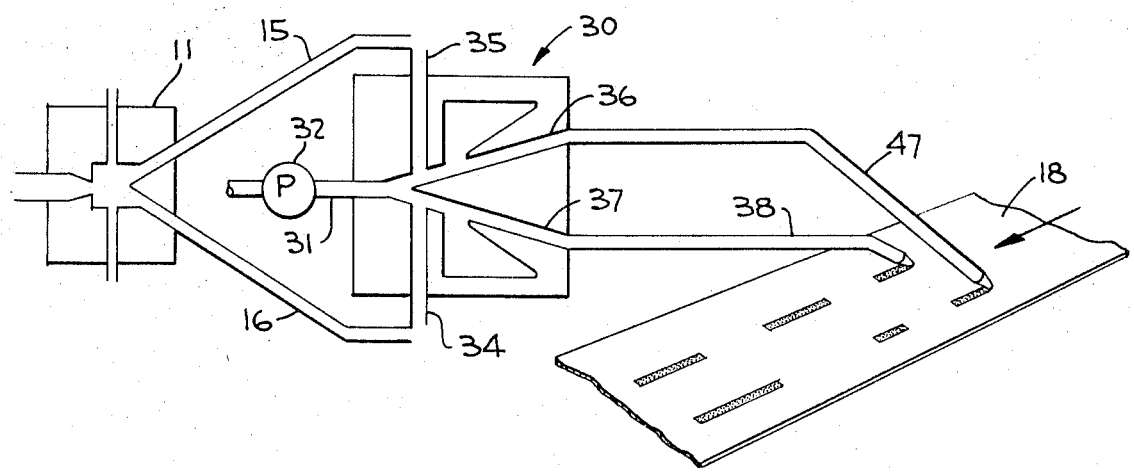
FIG. 3 illustrates an embodiment of the invention in which the secondary fluid amplifier responds to and monitors both outputs of the primary fluid amplifier.

In the embodiment illustrated in FIG. 3, both output channels 15 and 16 of primary fluid amplifier 11 are associated with control channels 35 and 34 respectively of secondary amplifier 30. Depending upon the rate of flow of fluid in each of output channels 15 and 16, the fluid in amplifier 30 will be diverted proportionally to output channels 36 and 37. This will, in turn, direct a proportional amount of fluid marking medium into channels 47 and 38 which in turn deposit the marking medium on surface 18. With this arrangement it is possible to simultaneously monitor both outputs 15 and 16 of a fluid amplifier 11 and obtain a permanent visual indication as a function of time of both outputs on a single recording medium. Again, the outputs can be of the proportional or digital type.

Figure 4:
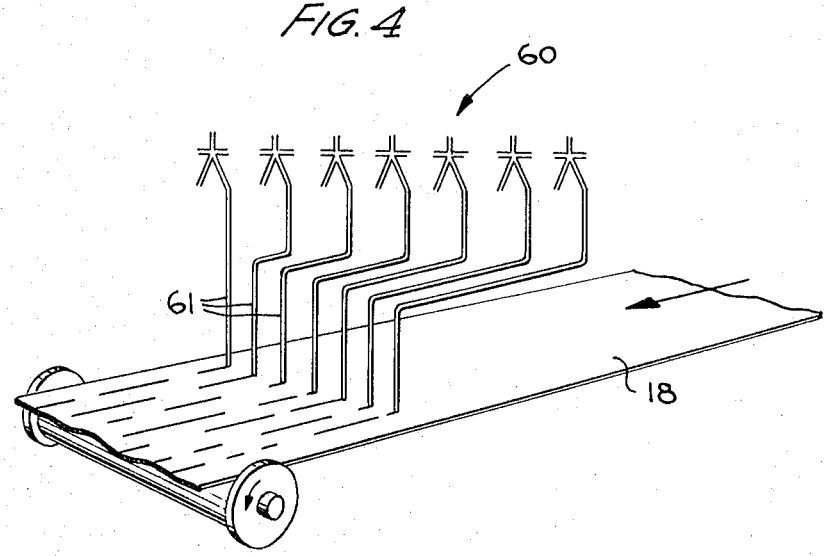
FIG. 4 illustrates an arrangement for simultaneously monitoring the outputs of a plurality of fluid amplifiers.

FIG. 4 illustrates an arrangement in which a plurality of fluid amplifiers 60 are provided with suitable and appropriate fluid marking mediums 61 for depositing permanent visual indications on a recording surface 18. This arrangement enable simultaneous visual comparison of a series of events which are monitored at a number of distributed locations.

The type of fluid marking medium employed can vary widely with the particular application desired and the type of recording surface utilized. Generally, the marking medium should possess the property of quick drying on paper when exposed to air. It should also have the properties of a uniform and consistent flow so as to increase reliability and accuracy of the results. The marking medium need not necessarily be a visible liquid such as ink. It can, for example, consist of a gaseous medium capable of staining a suitable surface. Similarly, finely divided powders may be used if they have adequate flow properties.

It should be appreciated that the principles of this invention may be utilized as a form of printing rather than just a means for monitoring the flow of fluid amplifiers. Thus a series of fluid amplifiers, each being provided with fluid marking medium and appropriate logic signals, can be programmed to deposit upon an appropriate recording surface a series of marks, figures and/or distinguishable letters. Naturally, different types or colors of marking medium may be employed.

It should be understood that the scope of this invention is defined by the claims and should not be limited by the exact details of construction shown and described, for obvious modifications will occur to persons skilled in the art.

I claim as my invention:

1. A system for producing a visual, permanent record as a function of time of the output of a proportional primary fluid amplifier comprising:
   a. a primary proportional fluid amplifier having a power nozzle for issuing a fluid, an interaction region, a pair of output channels and at least one control channel;
   b. a supply of liquid marking medium capable of imparting impressions upon a suitable recording surface;
   c. a secondary proportional fluid amplifier having a power nozzle, an interaction region, a pair of output channels and at least one control channel, said last-named power nozzle being supplied with said liquid marking medium, said secondary fluid amplifier being connected to at least one of said output channels of said primary fluid amplifier for causing a modulated flow of said liquid marking medium in response to the flow of fluid within said output channel of said primary fluid amplifier;
   d. a moving recording surface for receiving and retaining modulated impressions caused by the modulated flow of said marking medium from one of said output channels of said secondary fluid amplifier; and
   e. means for causing said surface to traverse at a predetermined rate;
   whereby the shapes of said modulated impressions are indications as a function of time of the fluid flow conditions within said output channel of said primary proportional fluid amplifier.

2. The readout system of claim 1 further comprising a plurality of primary fluid amplifiers and secondary fluid amplifiers connected to each of said primary fluid amplifiers.

3. The readout system of claim 1 wherein said secondary fluid amplifier further comprises a first output channel for receiving and transmitting said marking medium onto said surface, a second output channel for receiving and transmitting said marking medium to a reservoir and at least one control channel in fluid communication with said primary fluid amplifier, whereby the flow of fluid in the output of said primary fluid amplifier causes marking medium to be directed to the first output channel of said secondary fluid amplifier.

4. The readout system of claim 3 wherein the absence of a control signal to said secondary fluid amplifier causes said marking medium to be directed to said reservoir.

5. The readout system of claim 1 wherein said secondary fluid amplifier further comprises first and second output channels for receiving and transmitting said marking medium onto said surface and first and second control channels each in fluid communication with one of said pair of output channels of said primary fluid amplifier, whereby the flow of fluid in the outputs of said primary fluid amplifier provides proportional control for the flow of marking medium in said secondary fluid amplifier.

6. The readout system of claim 3 wherein said reservoir is said supply of marking medium.

7. The readout system of claim 4 wherein said secondary fluid amplifier further comprises a second control channel and means for selecting the amount of ambient pressure which is permitted to enter said second control channel.

* * * * *